(12) United States Patent
Summers, III et al.

(10) Patent No.: US 6,589,032 B2
(45) Date of Patent: Jul. 8, 2003

(54) PUMP AND PUMP PISTON ASSEMBLY

(75) Inventors: Herbert Stanley Summers, III, Trotwood, OH (US); David Fredrick Reuter, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 193 days.

(21) Appl. No.: 09/905,252

(22) Filed: Jul. 13, 2001

(65) Prior Publication Data

US 2003/0012670 A1 Jan. 16, 2003

(51) Int. Cl.$^7$ ................................................. F04B 1/04
(52) U.S. Cl. ........................................ 417/549; 417/470
(58) Field of Search ................................ 417/549, 570, 417/554, 545

(56) References Cited

U.S. PATENT DOCUMENTS

| | | | | |
|---|---|---|---|---|
| 5,395,219 | A | * | 3/1995 | Hosoya et al. ............... 417/454 |
| 6,302,663 | B1 | * | 10/2001 | Schuller et al. ............. 417/554 |
| 6,334,762 | B1 | * | 1/2002 | Hauser et al. ............... 417/569 |
| 6,340,295 | B1 | * | 1/2002 | Hauser et al. ............... 417/470 |
| 6,361,295 | B2 | * | 3/2002 | Schuller et al. ............. 417/549 |
| 6,394,770 | B1 | * | 5/2002 | Siegel et al. ................ 417/470 |
| 6,457,956 | B1 | * | 10/2002 | Hauser et al. ............... 417/470 |
| 6,471,496 | B1 | * | 10/2002 | Merklein et al. ............ 417/569 |
| 6,474,963 | B1 | * | 11/2002 | Wetzel et al. ............... 417/549 |
| 6,520,756 | B1 | * | 2/2003 | Alaze .......................... 417/441 |

* cited by examiner

Primary Examiner—Teresa Walberg
Assistant Examiner—Vinod D. Patel
(74) Attorney, Agent, or Firm—Scott A. McBain

(57) ABSTRACT

A pump and a pump piston assembly. The pump piston assembly includes a pump piston, a pump check valve, and a spring. The pump piston has a piston bore extending from a first piston end toward a second piston end. The pump check valve is positioned proximate the first piston end. The spring has an attached portion attached to the pump piston proximate the first piston end and has a biasing portion biasing the pump check valve to fluidly block the piston bore. The attached portion of the spring is closer to the second piston end than is the biasing portion of the sprint. The pump includes the pump piston assembly and a pump sleeve, wherein the pump piston is slidably engaged in the sleeve bore of the pump sleeve.

21 Claims, 5 Drawing Sheets

PUMP AND PUMP PISTON ASSEMBLY

TECHNICAL FIELD

The present invention relates generally to pumps, and more particularly to a pump piston assembly and to a pump piston assembly.

BACKGROUND OF THE INVENTION

Conventional pumps include pumps for vehicle control braking systems which perform anti-lock braking, stability enhancement, and traction control. In one conventional pump design, the pump includes a pump sleeve and a pump piston assembly. The pump sleeve has opposing first and second sleeve ends and has a sleeve bore extending from the second sleeve end toward the first sleeve end. The pump piston assembly has a pump piston, a pump check valve, a spring, and a spring retainer. The pump piston has opposing first and second piston ends and has a piston bore extending from the first piston end toward the second piston end. The pump piston is slidably engaged in the sleeve bore. The first piston end is located inside the sleeve bore, and the second piston end is located outside the sleeve bore. The second sleeve end is located between the first and second piston ends. The pump check valve is positioned proximate the first piston end. The spring is a cylindrical coil spring having a first spring end in contact with the inlet check valve and having a second spring end extending longitudinally away from piston. A spring retainer has one end attached (by a crimp or a press fit) to the first piston end and has another end which extends longitudinally away from the piston and which surrounds and retains the second spring end. The pump has a volumetric compression ratio equal to the ratio of the pumping chamber volume at the full piston withdrawal position to the pumping chamber volume at the full piston insertion position.

What is needed is a pump and a pump piston assembly, such as for a vehicle control braking system, which has a higher volumetric compression ratio.

SUMMARY OF THE INVENTION

In a first expression of a first embodiment of the invention, a pump piston assembly includes a pump piston, a pump check valve, and a spring. The pump piston has opposing first and second piston ends and has a piston bore extending from the first piston end toward the second piston end. The pump check valve is positioned proximate the first piston end. The spring has an attached portion attached to the pump piston proximate the first piston end and has a biasing portion biasing the pump check valve to fluidly block the piston bore. The attached portion of the spring is closer to the second piston end of the pump piston than is the biasing portion of the spring.

In a second expression of a first embodiment of the invention, a pump includes a pump sleeve and a pump piston assembly. The pump sleeve has opposing first and second sleeve ends and has a sleeve bore extending from the second sleeve end toward the first sleeve end. The pump piston assembly has a pump piston, a pump check valve, and a spring. The pump piston has opposing first and second piston ends and has a piston bore extending from the first piston end toward the second piston end. The pump piston is slidably engaged in the sleeve bore. The first piston end is positioned inside the sleeve bore, the second piston end is positioned outside the sleeve bore, and the second sleeve end is located between the first and second piston ends. The pump check valve is positioned proximate the first piston end. The spring has an attached portion attached to the pump piston proximate the first piston end and has a biasing portion biasing the pump check valve to fluidly block the piston bore. The attached portion of the spring is closer to the second piston end of the pump piston than is the biasing portion of the spring.

Several benefits and advantages are derived from the invention. The invention eliminates the protruding spring retainer of the prior art, and the spring of the invention extends back over the check valve to the piston instead of protruding beyond the check valve and the piston as in the prior art. This allows a smaller size and less expensive pump piston assembly and hence a smaller size and less expensive pump. Also, eliminating the protruding spring retainer and extending the spring back over the check valve allows a smaller volume in the pumping chamber (the region between the check valve and the bottom of the sleeve bore) at the full piston insertion position. This increases the pump volumetric compression ratio (the ratio of the pumping chamber volume at the full piston withdrawal position to the pumping chamber volume at the full piston insertion position). Increasing the pump volumetric compression ratio increases the efficiency of the pump which, for example, makes the pump more tolerant of air entrained in brake fluid when the pump is used in a controlled breaking system of a vehicle.

DESCRIPTION OF THE PREFERRED EMBODIMENTS

Figure 1:
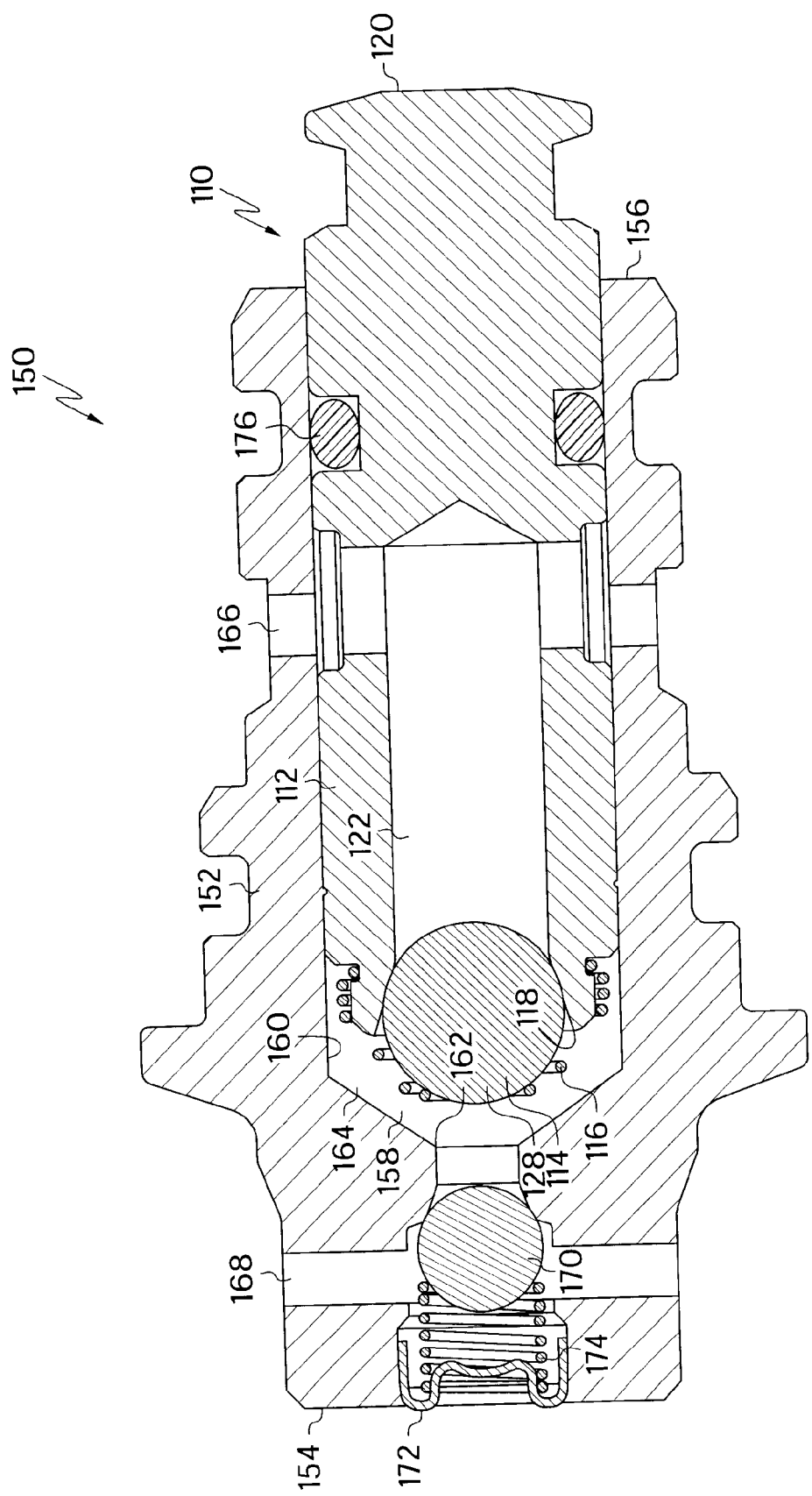
FIG. 1 is a schematic, side cross-sectional view of a first embodiment of a pump of the invention, wherein the pump includes a pump piston assembly.
Figure 2:
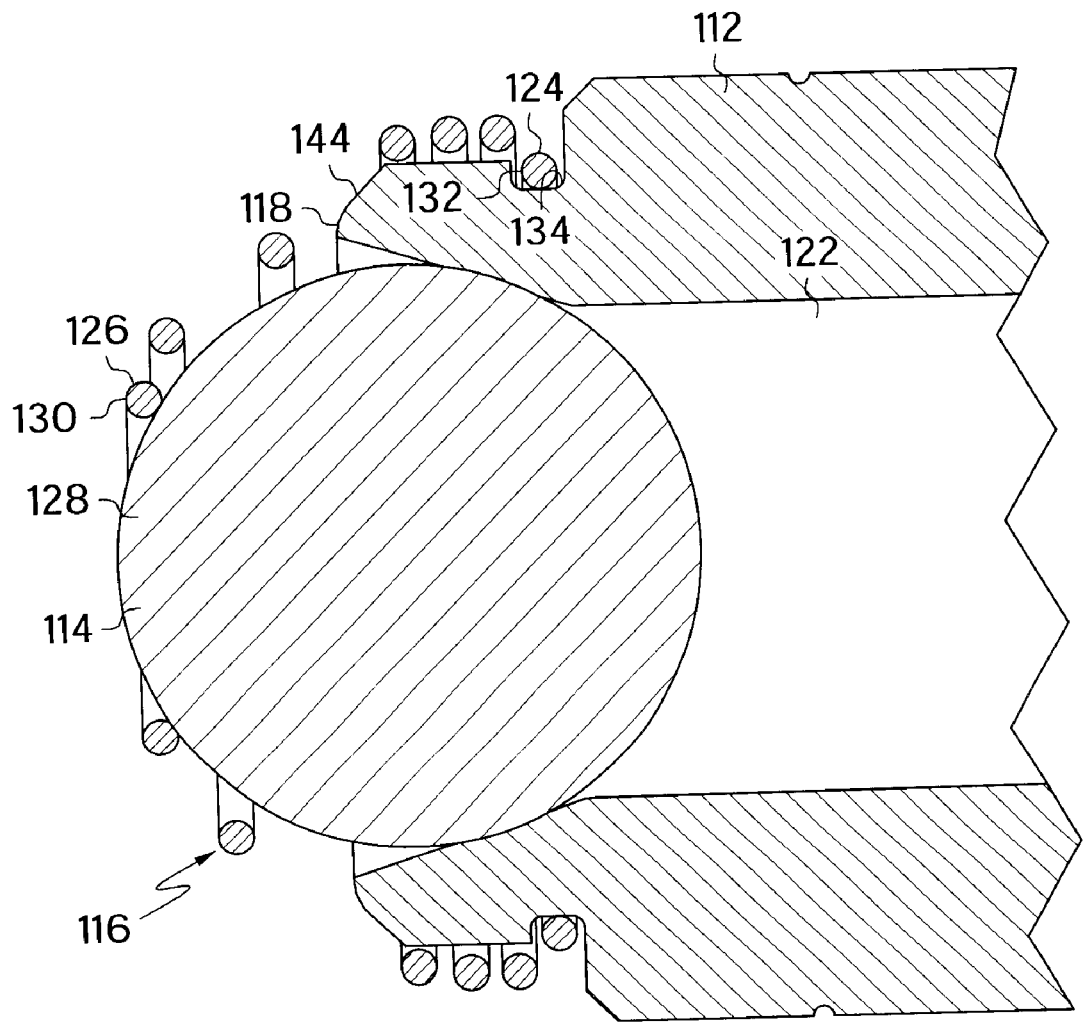
FIG. 2 is an enlarged view of the first piston end, check valve, and spring of the pump piston assembly of FIG. 1.
Figure 3:
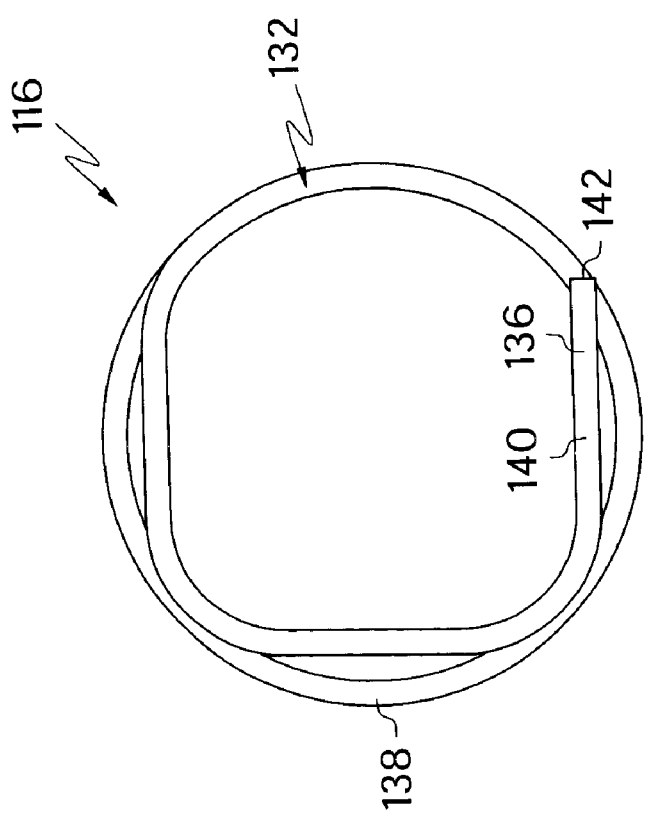
FIG. 3 is an end view of the larger-diameter end coil and a portion of an adjacent coil of the spring of FIG. 2.

Referring now to the drawings, wherein like numerals represent like elements throughout, FIGS. 1 through 3 illustrate a first embodiment of the present invention. In a first expression of the first embodiment shown in FIGS. 1–3, a pump piston assembly 110 includes a pump piston 112, a pump check valve 114, and a spring 116. The pump piston 112 has opposing first and second piston ends 118 and 120 and has a piston bore 122 extending from the first piston end 118 toward the second piston end 120. The pump check valve 114 is disposed proximate the first piston end 118. By the pump check valve 114 (or any other structure) being disposed "proximate the first piston end 118" is meant that the pump check valve 114 (or any other structure) is disposed closer to the first piston end 118 than to the second piston end 120. The spring 116 has an attached portion 124 attached to the pump piston 112 proximate the first piston end 118 and has a biasing portion 126 biasing the pump check valve 114 to fluidly block the piston bore 122. The attached portion 124 of the spring 116 is closer to the second piston end 120 than is the biasing portion 126 of the spring 116. This means that the distance between the attached portion 124 of the spring 116 and the second piston end 120 of the pump piston 112 is smaller than the distance between the biasing portion 126 of the spring 116 and the second piston end 120 of the pump piston 112.

In one example, the pump check valve 114 is a spherical inlet check valve 128. In one construction, the inlet check valve 128 consists essentially of metal. Other materials, shapes, and functions of the pump check valve 114 are left to the artisan.

In the same or another example, the spring 116 is a conical coil extension spring. A coil extension spring is a coil spring which exerts a returning spring force when the spring is longitudinally extended. A conical coil spring has its coils decrease in coil diameter along the spring longitudinal direction. The diameter of the spring wire typically is constant. The biasing portion 126 of the spring 116 contacts the pump check valve 114. The attached portion 124 of the spring 116 has a larger diameter than the diameter of the biasing portion 126 of the spring 116. The biasing portion 126 of the spring 116 retains the pump check valve 114 to the first piston end 118. In one design, the biasing portion 126 includes a smaller-diameter end coil 130, and the attached portion 124 includes an opposing larger-diameter end coil 132.

In the example described in the previous paragraph, the pump piston 112 has a circumferential groove 134, and the attached portion 124 of the spring 116 has a tang 136 disposed in the circumferential groove 134. In one modification, the spring 116 has an adjacent coil 138 adjacent the end coil 132, the end coil 132 has a flat 140 defining the tang 136, and the tang 136 has a free end 142 which overlaps the adjacent coil 138. In one design, the flat 140 is a three-sided flat (i.e., the end coil 132 is shaped to form three flat sides of a square with the fourth "side" of the "square" being curved as seen in FIG. 3). In other designs, not shown, the flat is a one or two-sided flat. In one variation, the pump piston 112 has a circumferential taper 144 contacting the spring 116 between the attached and biasing portions 124 and 126 of the spring 116. In one construction, the free end 142 of the tang 136 of the end coil 132 of the spring 116 does not overextend the adjacent coil 138 of the spring 116 either by having the free end 142 under-extend the adjacent coil 138 such as by having the free end 142 extend generally half way to where it would overlap the adjacent coil 138 or, as shown in FIG. 3, by having the free end 142 overlap but not protrude beyond the adjacent coil 138. This facilitates attachment of the spring 116. During attachment, the spring 116 is moved against the first piston end 118 whereby the end coil 132 first expands against the circumferential taper 144 and then contracts when it reaches the circumferential groove 134 with the tang 136 becoming disposed in the circumferential groove 134. In one construction, the spring 116 consists essentially of spring steel.

In a further example, not shown, the spring has a plurality of spring fingers extending longitudinally outward from, and extending radially inward from, a circular base. The base is attached to the pump piston. The fingers contact and bias the pump check valve to fluidly block the piston bore. Other spring designs are left to the artisan.

In one implementation, the pump piston 112 is a vehicle controlled-breaking-system pump piston. Other implementations of the pump piston 112 are left to those skilled in the art.

Figure 6:
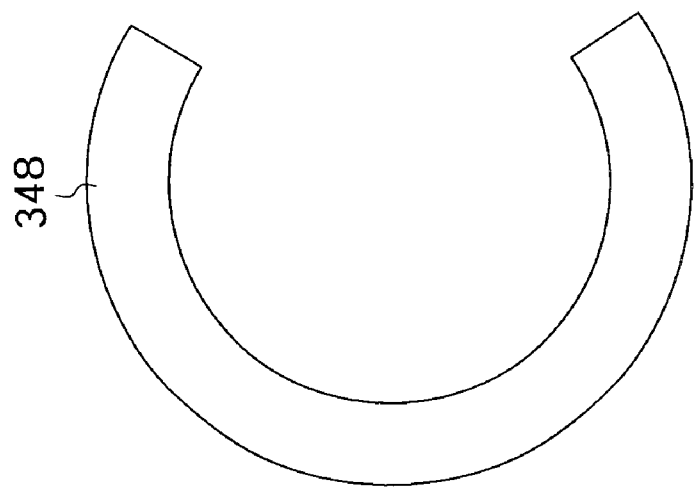
FIG. 6 is a front elevational view of the clip of FIG. 5.
Figure 4:
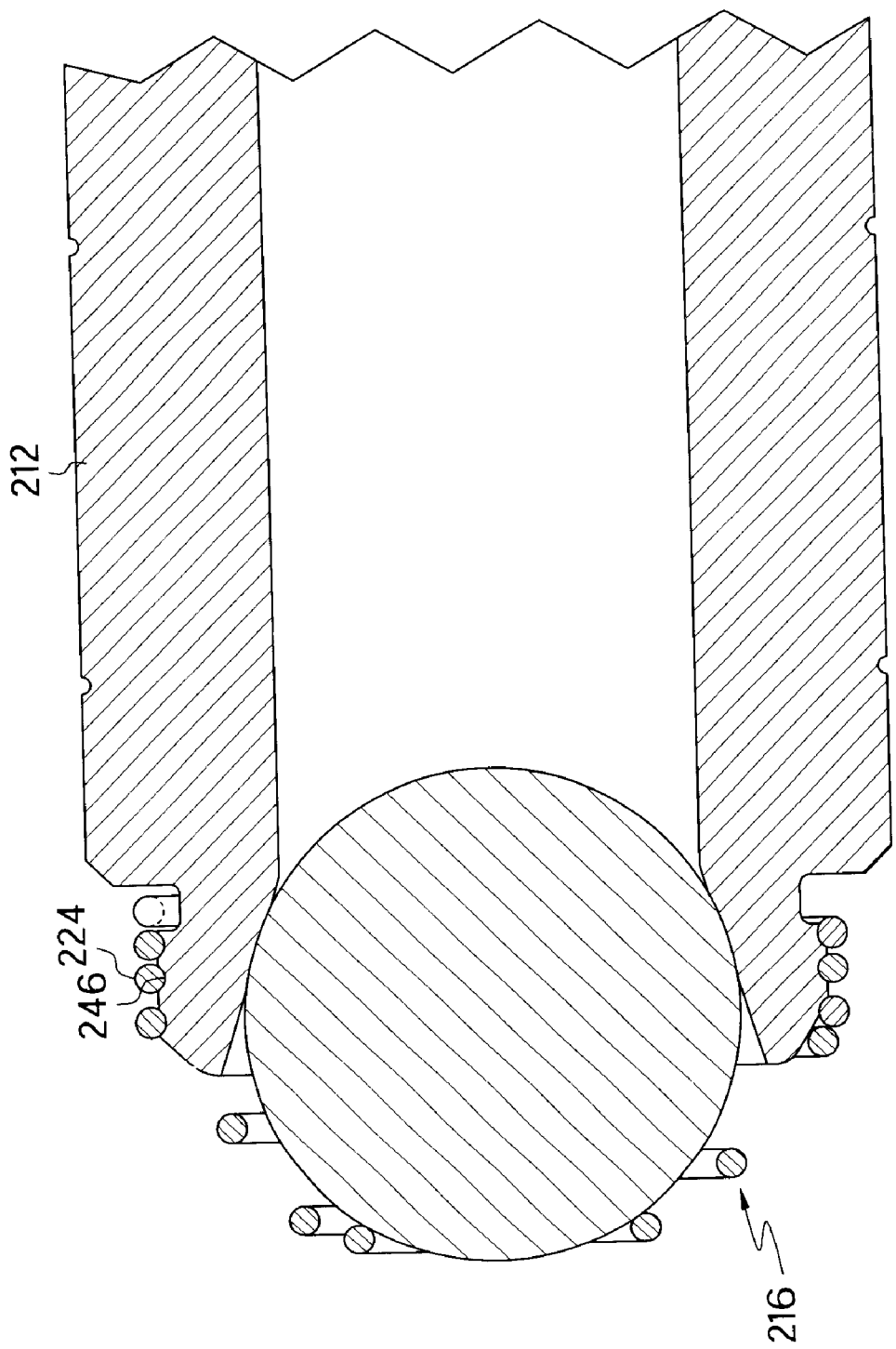
FIG. 4 is a view, as in FIG. 2, but of a second embodiment wherein the first piston end has threads and wherein the attached end of the spring is threaded onto the threads.
Figure 5:
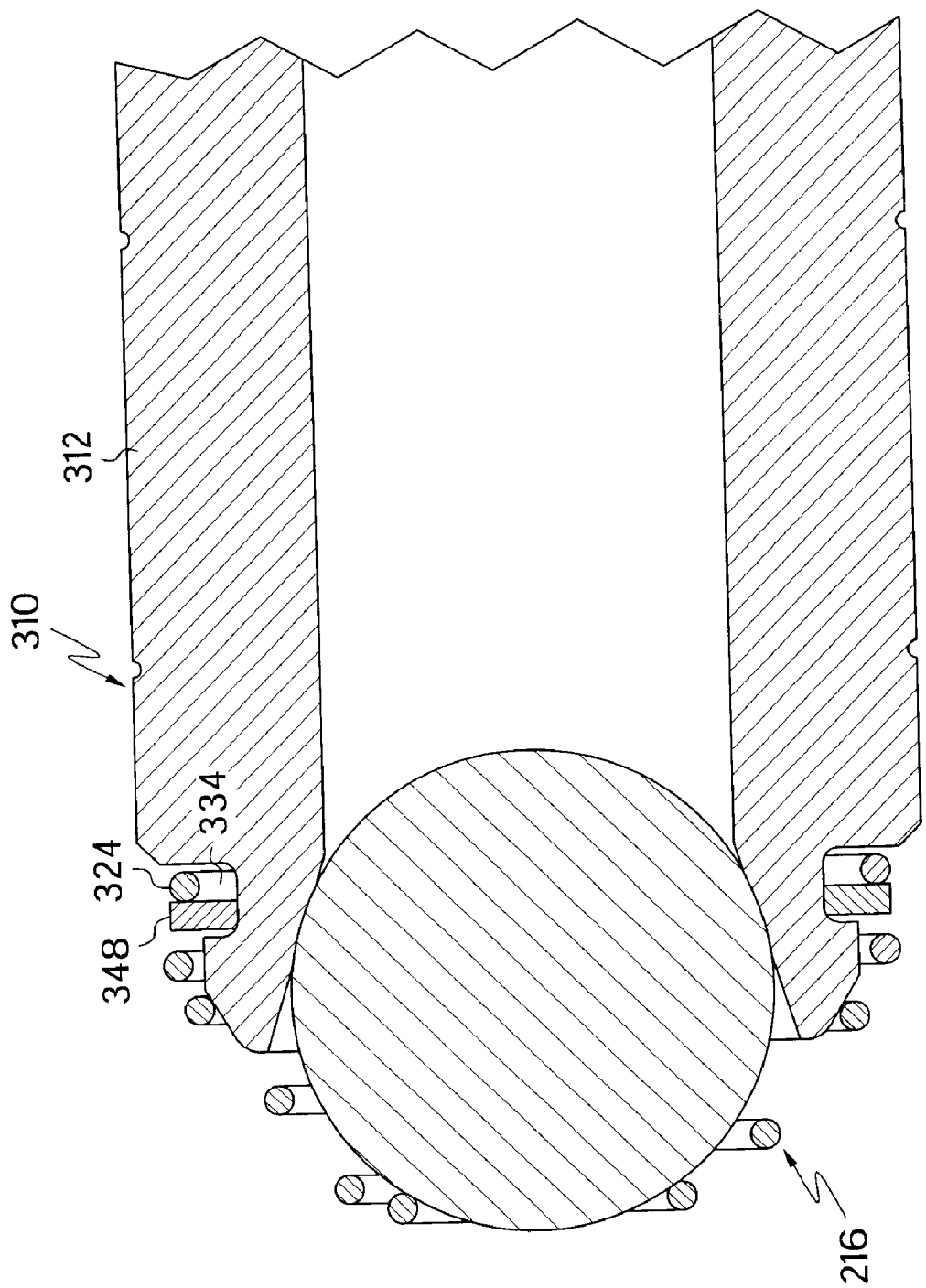
FIG. 5 is a view, as in FIG. 2, but of a third embodiment wherein a clip surrounds the attached end of the spring.

In a first expression of a second embodiment, as seen in FIG. 4, the pump piston 212 has threads 246, and the attached portion 224 of the spring 216 is threaded onto the threads 246. In a first expression of a third embodiment, as seen in FIGS. 5 and 6, the pump piston assembly 310 also includes a clip 348 surrounding the attached portion 324 of the spring 316 and disposed in the circumferential groove 334 of the pump piston 312. In one design, the clip 348 is a "C" clip (as shown in FIG. 6). In another design, not shown, the clip is an "E" clip. Other clip designs and other attachment embodiments are left to the artisan.

Returning to FIGS. 1–3, in a second expression of the first embodiment shown in FIGS. 1–3, a pump 150 includes a pump sleeve 152 and a pump piston assembly 110. The pump sleeve 152 has opposing first and second sleeve ends 154 and 156. The pump sleeve 152 also has a sleeve bore 158 extending from the second sleeve end 156 toward the first sleeve end 154. The pump piston assembly 110 includes a pump piston 112, a pump check valve 114, and a spring 116. The pump piston 112 has opposing first and second piston ends 118 and 120 and has a piston bore 122 extending from the first piston end 118 toward the second piston end 120. The pump piston 112 is slidably engaged in the sleeve bore 158. The first piston end 118 is disposed inside the sleeve bore 158, and the second piston end 120 is disposed outside the sleeve bore 158. The second sleeve end 156 is disposed between the first and second piston ends 118 and 120. The pump check valve 114 is disposed proximate the first piston end 118. By the pump check valve 114 (or any other structure) being disposed "proximate the first piston end 118" is meant that the pump check valve 114 (or any other structure) is disposed closer to the first piston end 118 than to the second piston end 120. The spring 116 has an attached portion 124 attached to the pump piston 112 proximate the first piston end 118 and has a biasing portion 126 biasing the pump check valve 114 to fluidly block the piston bore 122. The attached portion 124 of the spring 116 is closer to the second piston end 120 than is the biasing portion 126 of the spring 116. This means that the distance between the attached portion 124 of the spring 116 and the second piston end 120 of the pump piston 112 is smaller than the distance between the biasing portion 126 of the spring 116 and the second piston end 120 of the pump piston 112.

The previously-described examples, constructions, modifications, variations, designs, implementations, embodiments, etc. of the first expression of the invention of the pump piston assembly apply equally to the pump piston assembly portion of the pump of the second expression of the invention. In one example of the second expression of the first embodiment of the invention, the pump sleeve 150 has an interior surface portion 160 defining an end 162 of the sleeve bore 158, wherein the interior surface portion 160 has a substantially convex shape. The convex shape allows the end 162 of the sleeve bore 158 to more closely match the overall contour of the pump check valve 114 and the spring 116. This further reduces the volume of the pumping chamber 164 (i.e., the region between the pump check valve 114 and the end 162 of the sleeve bore 158) at the full piston insertion position which further increases the volumetric compression ratio of the pump, as can be appreciated by the artisan.

In one arrangement, as seen in FIG. 1, the pump sleeve 152 has a sidewall fluid inlet 166 in fluid communication with the piston bore 122 between the first and second piston ends 118 and 120. The pump sleeve 152 also has a fluid outlet 168 in fluid communication with the end 162 of the sleeve bore 158. An outlet check valve 170 is disposed between the fluid outlet 168 and the end 162 of the sleeve bore 158. A clip 172 retains a spring 174 which biases the outlet check valve 170. A seal 176 is disposed between the pump piston 112 and the pump sleeve 152 as shown in FIG. 1.

Several benefits and advantages are derived from the invention. The invention eliminates the protruding spring retainer of the prior art, and the spring of the invention extends back over the check valve to the piston instead of protruding beyond the check valve and the piston as in the prior art. This allows a smaller size and less expensive pump piston assembly and hence a smaller size and less expensive pump. Also, eliminating the protruding spring retainer and extending the spring back over the check valve allows a smaller volume in the pumping chamber (the region between the check valve and the bottom of the sleeve bore) at the full piston insertion position. This increases the pump volumetric compression ratio (the ratio of the pumping chamber volume at the full piston withdrawal position to the pumping chamber volume at the full piston insertion position). Increasing the pump volumetric compression ratio increases the efficiency of the pump which, for example, makes the pump more tolerant of air entrained in brake fluid when the pump is used in a controlled breaking system of a vehicle.

The foregoing description of several expressions and embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A pump piston assembly comprising:
   a) a pump piston having opposing first and second piston ends and having a piston bore extending from the first piston end toward the second piston end;
   b) a pump check valve disposed proximate the first piston end; and
   d) a spring having an attached portion attached to the pump piston proximate the first piston end and having a biasing portion biasing the pump check valve to fluidly block the piston bore, wherein the attached portion is closer to the second piston end than is the biasing portion.

2. The pump piston assembly of claim 1, wherein the pump check valve is a spherical inlet check valve.

3. The pump piston assembly of claim 2, wherein the spring is a conical coil extension spring, wherein the biasing portion of the spring contacts the pump check valve, and wherein the attached portion of the spring has a larger diameter than the biasing portion of the spring.

4. The pump piston assembly of claim 3, wherein the pump piston has a circumferential groove, and wherein the attached portion of the spring has a tang disposed in the circumferential groove.

5. The pump piston assembly of claim 4, wherein the spring has an end coil and an adjacent coil, wherein the end coil has a flat defining the tang, wherein the tang has a free end which overlaps the adjacent coil.

6. The pump piston assembly of claim 5, wherein the pump piston has a circumferential taper contacting the spring between the attached and biasing portions of the spring.

7. The pump piston assembly of claim 6, wherein the free end of the tang of the end coil of the spring does not overextend the adjacent coil of the spring.

8. The pump piston assembly of claim 3, wherein the pump piston has threads, and wherein the attached portion of the spring is threaded onto the threads.

9. The pump piston assembly of claim 3, also including a clip surrounding the attached portion of the spring and disposed in the circumferential groove of the pump piston.

10. The pump piston assembly of claim 1, wherein the pump piston is a vehicle controlled-breaking-system pump piston.

11. A pump comprising:
   a) a pump sleeve having opposing first and second sleeve ends and having a sleeve bore extending from the second sleeve end toward the first sleeve end;
   b) a pump piston assembly having:
      1) a pump piston having opposing first and second piston ends and having a piston bore extending from the first piston end toward the second piston end, wherein the pump piston is slidably engaged in the sleeve bore, wherein the first piston end is disposed inside the sleeve bore, wherein the second piston end is disposed outside the sleeve bore, and wherein the second sleeve end is disposed between the first and second piston ends;
      2) a pump check valve disposed proximate the first piston end; and
      3) a spring having an attached portion attached to the pump piston proximate the first piston end and having a biasing portion biasing the pump check valve to fluidly block the piston bore, wherein the attached portion is closer to the second piston end than is the biasing portion.

12. The pump of claim 11, wherein the pump check valve is a spherical inlet check valve.

13. The pump of claim 12, wherein the pump sleeve has an interior surface portion defining an end of the sleeve bore, and wherein the interior surface portion has a generally convex shape.

14. The pump of claim 12, wherein the spring is a conical coil extension spring, wherein the biasing portion of the spring contacts the pump check valve, and wherein the attached portion of the spring has a larger diameter than the biasing portion of the spring.

15. The pump of claim 14, wherein the pump piston has a circumferential groove, and wherein the attached portion of the spring has a tang disposed in the circumferential groove.

16. The pump of claim 15, wherein the spring has an end coil and an adjacent coil, wherein the end coil has a flat defining the tang, wherein the tang has a free end which overlaps the adjacent coil.

17. The pump of claim 16, wherein the pump piston has a circumferential taper contacting the spring between the attached and biasing portions of the spring.

18. The pump of claim 17, wherein the free end of the tang of the end coil of the spring does not overextend the adjacent coil of the spring.

19. The pump of claim 14, wherein the pump piston has threads, and wherein the attached portion of the spring is threaded onto the threads.

20. The pump of claim 14, also including a clip surrounding the attached portion of the spring and disposed in the circumferential groove of the pump piston.

21. The pump of claim 11, wherein the pump piston is a vehicle controlled-breaking-system pump piston.

* * * * *